United States Patent [19]
Bollman

[11] 4,157,869
[45] Jun. 12, 1979

[54] TRANSPARENCY REPRODUCING MACHINE

[75] Inventor: James E. Bollman, Williamson, N.Y.

[73] Assignee: Xerox Corporation, Stamford, Conn.

[21] Appl. No.: 798,194

[22] Filed: May 18, 1977

[51] Int. Cl.² ............... G03G 15/01; G03B 27/32
[52] U.S. Cl. ............................... 355/4; 355/7; 355/43; 355/46
[58] Field of Search ........... 355/3 R, 7, 8, 11, 22, 355/24, 4, 43, 46

[56] References Cited
U.S. PATENT DOCUMENTS

| | | | |
|---|---|---|---|
| 3,523,725 | 8/1970 | Schaeffer | 355/8 |
| 3,982,833 | 9/1976 | Kolibas | 355/11 |
| 4,027,962 | 6/1977 | Mailloux | 355/3 R X |
| 4,043,656 | 8/1977 | Cherian | 355/3 R |

*Primary Examiner*—Fred L. Braun
*Attorney, Agent, or Firm*—James J. Ralabate; John E. Beck; Michael H. Shanahan

[57] ABSTRACT

An electrostatographic printing machine in which a plurality of transparencies are reproduced simultaneously on a common copy sheet.

The printing machine utilizes a pair of slide projectors arranged so that they simultaneously project non-overlapping light images of the transparencies onto the charged portion of the photoconductive member.

5 Claims, 2 Drawing Figures

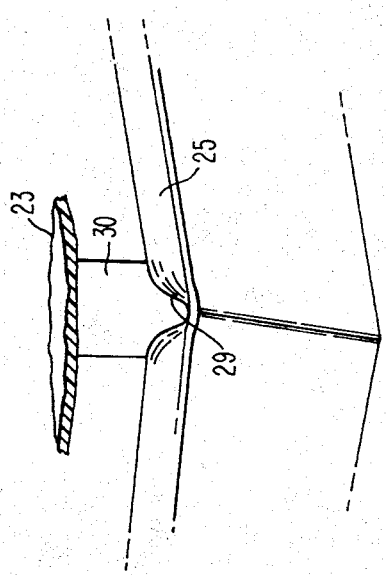
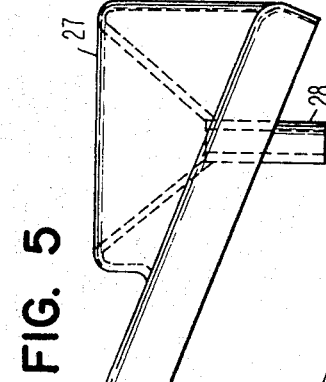
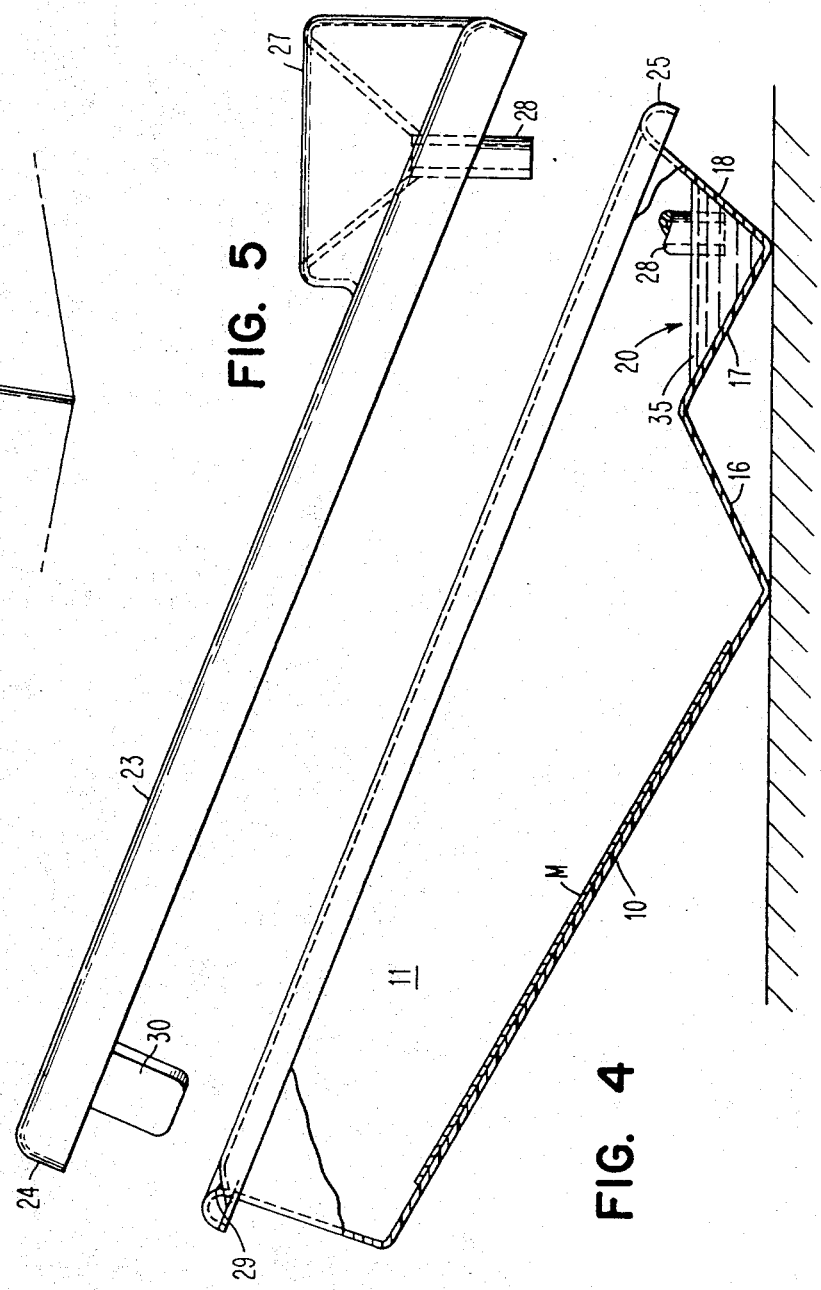

TRANSPARENCY REPRODUCING MACHINE

BACKGROUND OF THE INVENTION

This invention relates generally to an electrostatographic printing machine, and more particularly concerns a printing machine arranged to reproduce a plurality of transparencies substantially simultaneously.

An electrostatographic printing process involves the formation and utilization of electrostatic latent charge patterns for the purpose of recording and reproducing the patterns in viewable form. The field of electrostatographic printing includes electrophotographic and electrographic printing. Electrophotographic printing is that class of electrostatographic printing which employs a photosensitive medium to form, with the aid of electromagnetic radiation, the electrostatic latent charge pattern. Electrography is that class of electrostatographic printing which utilizes an insulating medium, to form, without the aid of electromagnetic radiation, the electrostatic latent charge pattern. In all of the foregoing machines, it is highly desirable to be capable of reproducing transparencies. More particularly, it is highly advantageous to be capable of reproducing substantially simultaneously a plurality of transparencies on a common copy sheet.

The process of electrophotographic printing will be described hereinafter as an exemplary system for achieving the foregoing. An electrophotographic printing machine exposes a charged photoconductive surface to the light images of the transparencies being reproduced. The irradiated areas of the photoconductive surface are discharged to record thereon electrostatic latent images corresponding to the transparencies. A development system moves the developer mix of carrier granules and toner particles into contact with the photoconductive surface. The toner particles are attracted electrostatically from the carrier granules to the latent image forming a toner powder image thereon. Thereafter, the toner powder image is transferred to a sheet of support material. In many types of electrophotographic printing machines, the sheet of support material is the photoconductive surface and the step of transfer is not required. In either case, a fusing device permanently affixes the toner powder image to the sheet of support material.

Many special purpose electrophotographic printing machines have been developed and are in wide commercial use. For example, electrophotographic printing machines are presently available for reproducing microfilm. In general, a microfilm reproducing machine produces an enlarged copy of a microfilm original. However, high quality reproduction of color slides has only been recently achieved. This process is exemplified by co-pending application Ser. No. 540,617 filed on Jan. 13, 1975, now U.S. Pat. No. 4,027,962, and co-pending application Ser. No. 663,389 filed on Mar. 3, 1976, now U.S. Pat. No. 4,043,656. As described in the foregoing applications, a light image of a color transparency is projected onto a mirror. The mirror reflects the light image through a screen and field lens onto the charged portion of the photoconductive surface. This light image is filtered to record a single color electrostatic latent image on the photoconductive surface. Successive single color electrostatic latent images are recorded and developed with the appropriately colored toner particles. These toner powder images are transferred to a sheet of support material in superimposed registration with one another. This multilayered toner powder image is then permanently affixed to the sheet of support material forming a copy of the color slide being reproduced. Improvements in this process include positioning a mirror in the path of the transparency light image to direct the light image onto the charged portion of the photoconductive member with the mirror being readily removable from the optical light path when opaque original documents are being reproduced. In the foregoing type of transparency reproducing machine, a plurality of size for size copies of the transparency may be formed on a single copy sheet or an enlargement of one transparency may be formed on a single copy sheet. No provision is contained therein for reproducing a plurality of transparencies as enlargements on a common copy sheet.

Accordingly, it is a primary object of the present invention to improve electrophotographic printing machines so as to reproduce a plurality of transparencies as enlargements on a common copy sheet.

SUMMARY OF THE INVENTION

Briefly stated, and in accordance with the present invention, there is provided an electrostatographic printing machine for reproducing simultaneously a plurality of transparencies.

Pursuant to the features of the invention, means are provided for forming a plurality of latent images on a recording member. Each latent image corresponds to an enlargement of one of the transparencies being reproduced. Means develop each latent image with particles to form a plurality of powder images on the recording member.

BRIEF DESCRIPTION OF THE DRAWINGS

Other objects and advantages of the present invention will become apparent upon reading the following detailed description and upon reference to the drawings, in which.

Figure 1:
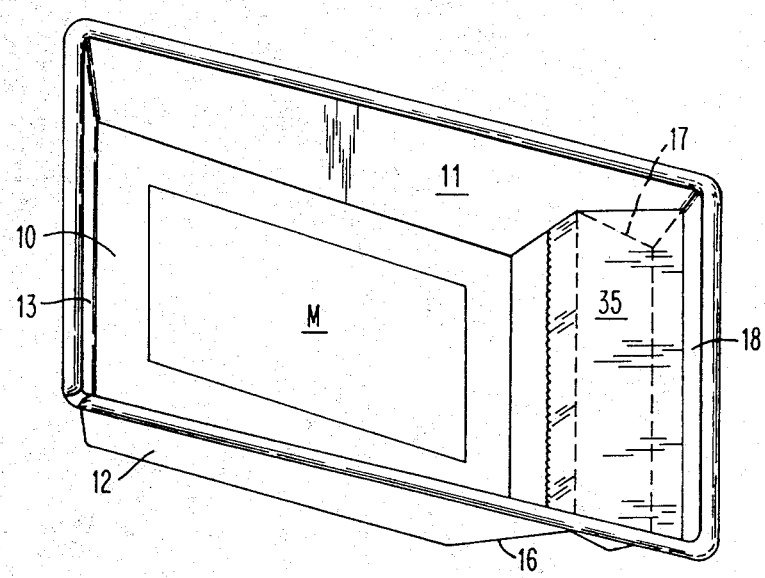
FIG. 1 is a schematic perspective view of an electrophotographic printing machine incorporating the features of the present invention therein.

While the present invention will hereinafter be described in connection with a preferred embodiment thereof, it is understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

For a general understanding of an electrophotographic printing machine incorporating the features of the present invention therein, continued reference is had to the drawings. In the drawings, like reference numerals have been used throughout to designate identical elements. Although the electrophotographic printing machine of the present invention is particularly well adapted for reproducing a plurality of color transparencies substantially simultaneously, it should become evident from the following discussion that it is equally well suited for use in a wide variety of applications such as producing copies from black and white transparencies or from opaque original documents and is not necessarily limited to the particular embodiment shown herein.

An illustrative schematic of the electrophotographic printing machine is shown in FIG. 1. As depicted therein, the electrophotographic printing machine utilizes a photoconductive member as a recording member. The photoconductive member comprises a drum 10 mounted rotatably within the machine frame (not shown) with photoconductive surface 12 secured to and entrained about a conductive substrate. Preferably, photoconductive surface 12 is made from a suitable panchromatic selenium alloy such as is described in U.S. Pat. No. 3,655,377, issued to Sechak in 1972. The conductive substrate is made preferably from aluminum.

As drum 10 rotates in the direction of arrow 14, photoconductive surface 12 passes through a series of processing stations located about the periphery thereof. Drum 10 is rotated at a constant angular velocity so that the proper sequencing of events may occur at each of the processing stations. Timing for each event is achieved by a signal generator (not shown) operatively associated with drum 10. The signal generator develops electrical pulses which are processed by the machine logic so that each processing station is activated at the appropriate time during the rotation of drum 10.

Intially, drum 10 rotates through charging station A. At charging station A, a corona generating device, indicated generally by the reference numeral 16, charges at least a portion of photoconductive surface 12 to a relatively high, substantially uniform level. A suitable corona generating device is described in U.S. Pat. No. 3,875,407 issued to Hayne in 1975.

After photoconductive surface 12 is charged to a substantially uniform level, drum 10 rotates the charged portion thereof to exposure station B. At exposure station B, colored filtered light images of color transparencies 18 and 19, as exemplified by 35 mm slides, are projected onto the charged portion of photoconductive surface 12. Color transparencies 18 and 19 are positioned in slide projectors 20 and 21, respectively. Slide projectors 20 and 21 include light sources 22 and 23 adapted to illuminate transparencies 18 and 19, respectively. In addition, slide projectors 20 and 21 comprise lenses 24 and 25 having an adjustable focus to produce an enlarged or magnified image of color transparencies 18 and 19. Slide projector 20 is mounted on a portion of printing machine frame, designated by the reference numeral 26. A bar 28 has end portion 30 mounted pivotably on frame 26. End 32 of bar 28 is secured rotatably to mirror 34. In this way, bar 28 may be pivoted relative to frame 26 so as to move mirror 34 out of the path of the transparency light image when an opaque original document is being reproduced by the electrophotographic printing machine. Contrawise, when transparencies are being reproduced, bar 28 is pivoted to position mirror 34 in the path of the transparency light image. Thus, the light image of transparency 18 projected from slide projector 20, is transmitted to mirror 34 which directs it through aperture 27 of mirror 29. The light image of transparency 18 passes through field lens 36, e.g. a Fresnel lens, and transparent platen 38. Interposed between field lens 36 and transparent platen 38 is an optional opaque sheet 40 having apertures therein, i.e., a picture frame or informational frame, which may be considered a composition frame. Composition frame 40 defines an opaque border extending outwardly from the color transparency image. Frame 40 may have indicia inscribed thereon. A screen 42 may be disposed beneath field lens 36, i.e. interposed between field lens 36 and composition frame 40. Screen 42 modulates the color transparency light images forming half-tone light images. The foregoing describes the projection of a light image corresponding to transparency 18. Substantially simultaneously, a light image of transparency 19 is projected onto mirror 29. When transparencies are being reproduced, slide projector 21 projects a light image of transparency 19 onto mirror 29. Mirror 29 directs the light image of transparency 19 downwardly through field lens 36, platen 38, composition frame 40 and screen 42. Slide projectors 20 and 21 are actuated simultaneously. Composition frame 40 has a pair of apertures or picture frames defining an opaque border extending outwardly from the light images of the color transparencies. These light images are enlargements of the color transparencies. Thus, a pair of enlarged light images of color transparencies 18 and 19 are projected simultaneously through field lens 36, platen 38, composition frame 40 and screen 42. A scanning system, disposed beneath platen 38, includes a moving lens system designated, generally by the reference numeral 34, and a color filter mechanism, shown generally at 46. Lamps 48 move in a timed relationship with lens 44 and filter mechanism 46 to scan and illuminate successive incremental areas of composition frame 40 which may be optionally placed on platen 38. In this manner, half-tone light images of the color transparencies may be combined with a light image of the composition frame to form a combined image. This combined image is transmitted onto the charged portion of photoconductive surface 12 selectively dissipating the charge thereon to record on electrostatic latent image.

As shown in FIG. 1, screen 42 is interposed between composition frame 40 and field lens 36. Slide projectors 20 and 21 project the transparency light images which are reflected through screen 42 so as to be modulated thereby. The combined light image of the transparencies and composition frame are reflected by mirror 50 through lens 52 and filter 54 forming a single color light image. This single color light image is reflected by mirror 53 in a downwardly direction onto the charged portion of photoconductive surface 12. Thus, the modulated single color light image irradiates the charged portion of photoconductive surface 12 recording a single color electrostatic latent image thereon. Similarly, the light image of composition frame 40 irradiates the charged portion of photoconductive surface 12 forming an unmodulated light image thereof in registration with the single color electrostatic latent image formed from the modulated light images of the color transparencies.

Filter mechanism 46 interposes color filters in the optical light path of lens 44 during the exposure process. The appropriate filter operates on the light rays transmitted through lens 44 to form a light image corresponding to a single color of the transparencies.

Lamps 48 are arranged to traverse platen 38 illuminating incremental widths of composition frame 40. Lamps 48 are mounted on a suitable carriage (not shown) which is driven by a cable pulley system (not shown) from the drive motor (not shown) rotating drum 10. As the lamp carriage traverses platen 58, another cable pulley system (not shown) moves lens 44 and filter 46 at a correlated speed therewith Filter assembly 46 is mounted on a suitable bracket extending from lens 44 to move in conjunction therewith.

Preferably, slide projectors 20 and 21 are Kodak Carousel 600 projectors having an F/3.5 Ektaner C projection lens with light sources 22 and 23 being quartz lamps. Field lens 36 is preferably a Fresnel lens comprising small, recurring light deflecting elements that will, as an entire unit, achieve a uniform distribution of light over a predetermined area. The gratings or grooves therein are preferably about 200 or more per inch. Field lens 36 converges the diverging light rays of the light images projected from slide projectors 20 and 21. Thus, the light rays transmitted through platen 38 are substantially parallel to one another. Other suitable field lenses may be employed in lieu of a Fresnel lens. The light image of the color transparencies pass through screen 42. Screen 42 modulates this light image forming half-tone light images. Hence, a modulated light image is combined with the unmodulated light image of composition frame 40 and incremental areas thereof are projected onto photoconductive surface 12 discharging the charge thereon.

With continued reference to FIG. 1, after the electrostatic latent image is recorded on photoconductive surface 12, drum 10 rotates to development station C. At development station C, three individual developer units, generally indicated by the reference numerals 52, 54 and 56, respectively, are arranged to render visible the electrostatic latent image recorded on photoconductive surface 12. Preferably, each of the developer units are of a type generally referred to in the art as "magnetic brush developer units". A typical magnetic brush developer unit employs a magnetizable developer mix which includes carrier granules and heat settable toner particles. In operation, the developer mix is continually brought through a directional flux field forming a chain-like array of fibers extending outwardly from a developer roll. This chain-like array of fibers is frequently termed a brush. The electrostatic latent image recorded on photoconductive surface 12 is rotated into contact with the brush of developer mix. Toner particles are attracted from the carrier granules to the latent image. Each of the developer units contain appropriately colored toner particles. For example, a green filtered light image is developed by depositing magenta toner particles thereon. Similarly, a red filtered light image is developed with cyan toner particles and a blue filtered light image with yellow toner particles. A development system of this type is described in U.S. Pat. No. 3,854,449 issued to Davidson in 1974.

After the single color electrostatic latent image is developed, drum 10 rotates the toner powder image to transfer station D. At transfer station D, the toner powder image adhering electrostatically to photoconductive surface 12 is transferred to a sheet of support material 58. Support material 58 may be plain paper or a sheet of plastic material, amongst others. Transfer station D includes corona generating means indicated generally at 60, and a transfer roll designated generally by the reference numeral 62. Corona generator 60 is excited with an alternating current and arranged to precondition the toner powder image adhering electrostatically to photoconductive surface 12. In this manner, the pre-conditioned toner powder image will be more readily transferred from the electrostatic latent image recorded on photoconductive surface 12 to support material 54 secured releasably on transfer roll 62. Transfer roll 62 recirculates support material 58 and is electrically biased to a potential of sufficient magnitude and polarity to attract electrostatically the pre-conditioned toner particles from the latent image recorded on photoconductive surface 12 to support material 58. Transfer roll 62 rotates in the direction of arrow 64, in synchronism with drum 10, to maintain support material 58 secured releasably thereon rotating in registration with the toner powder image developed on photoconductive surface 12. In this way, successive toner powder images may be transferred to support material 58 in superimposed registration with one another. U.S. Pat. No. 3,383,918 issued to Fisher in 1974 discloses a suitable transfer system.

Prior to proceding with the remaining processing stations, the sheet feeding apparatus will be briefly described. Support material 58 is advanced from a stack 66 mounted on a tray 68. Feed roll 70, in operative communication with retard roll 72, advances and separates the uppermost sheet from stack 66. The advancing sheet moves into chute 74 which directs it into the nip between register rolls 76. Register rolls 76 align and forward the sheet to gripper fingers 78 which secure support material 58 releasably on transfer roll 62. After the requisite number of toner powder images have been transferred to support material 58, gripper fingers 78 release support material 58 and space it from transfer roll 62. As transfer roll 62 continues to rotate in the direction of arrow 64, stripper bar 80 is interposed therebetween. In this way, support material 58 passes over stripper bar 80 onto endless belt conveyer 82. Endless belt conveyor 82 advances support material 58 to fixing station E.

At fixing station E, a fuser, indicated generally by the reference numeral 84, generates sufficient heat to permanently affix the multi-layered powder image to support material 58. A suitable fusing device is described in U.S. Pat. No. 3,781,516 issued to Tsilibes et al. in 1973. After the fixing process, support material 58 is advanced by endless belt conveyors 86 an 88 to catch tray 90 permitting the machine operator to remove the finished color copy from the printing machine.

Although a preponderance of the toner particles are transferred to support material 58, invariably some residual toner particles remain adhering to photoconductive surface 12 after the transfer process. These residual toner particles are removed from photoconductive surface 12 at cleaning station F. Cleaning station F includes a corona generatng device (not shown) for neutralizing the electrostatic charge remaining on the residual toner particles and photoconductive surface 12. The neutralized toner particles are then cleaned from photoconductive surface 12 by a rotatably mounted fibrous brush 92 in contact therewith. A suitable brush cleaning device is described in U.S. Pat. No. 3,590,412 issued to Gerbasi in 1971.

It is believed that the foregoing description is sufficient for purposes of the present application to illustrate the general operation of the color electrophotographic printing machine incorporating the features of the present invention therein.

Figure 2:
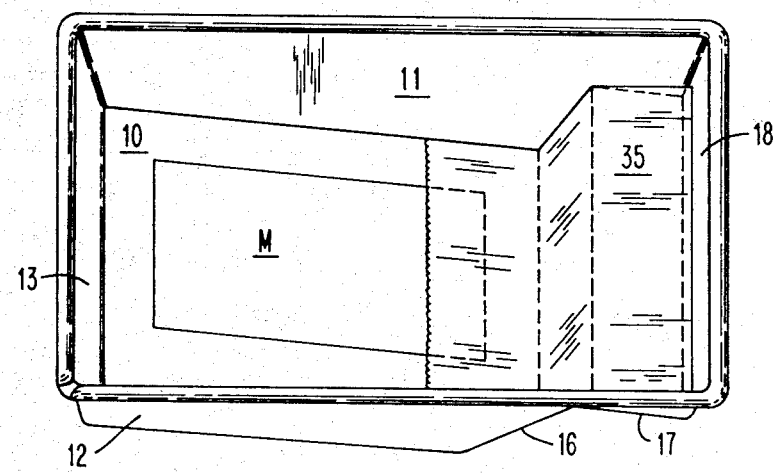
FIG. 2 is a schematic illustration of the FIG. 1 printing machine optical system.
Figure 3:
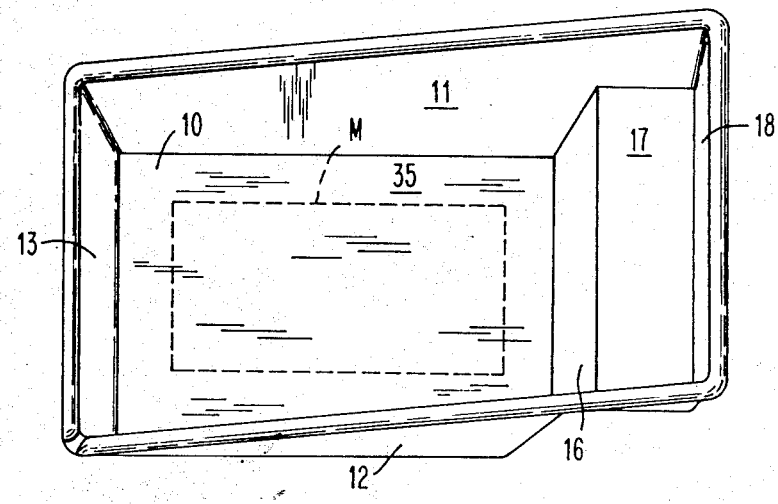

Referring now to FIG. 2, the specific characteristics of the optical system employed in the FIG. 1 printing machine will be discussed. As hereinbefore indicated, projectors 20 and 21 preferably are Kodak Carousel 600 projectors having an F/3.5 Ektaner C projection lens. Light sources 22 and 23 are quartz lamps. Projector 20 is mounted on frame 26 of the printing machine. Arm 28 has mirror 34 secured rotatably on end portion 32 thereof. Similarly, end portion 30 of arm 28 is mounted pivotably on frame 26. One suitable configuration for arm 28 is U-shaped. With a configuration of this type, portions 30 and 32 extend substantially normal to the central portion of arm 28. In the transparency reproduction mode, arm 28 is pivoted so as to dispose mirror 34 in the path of the transparency light image. Mirror 34 is rotated on portion 32 of arm 28 so that the light image is reflected in a downwardly direction through aperture 27 of mirror 29. The light image then passes through field lens 36, screen 42, composition frame 40 and platen 38. Projector 21 projects a light image of transparency 19 onto mirror 29 substantially simultaneously with projector 20 projecting a light image of transparency 18 through aperture 27 of mirror 29. Mirror 29 directs the light image of transparency 19 through field lens 36, screen 42, composition frame 20 and platen 38. Mirror 29 preferably has the surface thereof opposed from projector 21 so as to direct the light image of transparency 19 in a downwardly direction. A rectangular opening 27 occupies approximately one-half of mirror 29. This enables an enlargement of transparency 18 to be projected by mirror 34 in a downwardly direction through opening 27 in mirror 29. In this manner, a pair of non-overlapping light images corresponding to transparencies 18 and 19, respectively, are projected substantially simultaneously through field lens 36, screen 42, composition frame 20 and platen 38. Preferably, slide projector 21 is mounted on frame 31 of the printing machine.

As previously noted, field lens 36 comprises a plurality of small light deflecting elements that provide a uniform distribution of light over a pre-determined area. Preferably, there are 200 or more gratings per inch. Field lens 36 converges the diverging light rays from lens 24 and 25. This insures that the light rays transmitted through platen 38 are substantially parallel. Many other types of field lenses may be employed in lieu of a Fresnel lens, provided they converge the diverging light rays emitted from slide projectors 20 and 21.

Screen 42 modulates the light images to form halftone light images. Preferably, screen 42 includes a substantially transparent sheet made from a suitable plastic or glass. A plurality of spaced, opaque dots or lines are printed on the transparent sheet by a suitable chemical etching or photographic technique. The screen may be made from any number of opaque metallic materials suitable for chemical etching which are sufficiently thin to be flexible, such as copper or aluminum. The spacing between adjacent lines or dots determines the quality of the resulting copy. A fine screen size generally results in a more natural or higher quality copy. Hence, while a coarse screen having 50 to 60 lines or dots per inch will be useful for some purposes, finer screens such as those having anywhere from 100 to 400 dots or lines per inch will form a copy of nearly continuous toner. As the screen size becomes finer, the screen pattern will be imperceptible on the finished copy and the copy will have the appearance of a continuous tone photograph. Preferably, a dot screen is positioned on the platen. A suitable line screen will have about 120 lines per inch. Contrawise, a suitable dot screen may include a plurality of equally spaced, soft gray square dots having about 85 dots per inch. However, this may range from about 65 to about 300 dots per inch. The foregoing is only limited by the optical system and the desired resolution. A suitable dot screen for disposition on the platen is manufactured by Caprock Corporation and may be a negative screen. An optical system employing such a screen for reproducing transparencies is described in co-pending application Ser. No. 540,617 filed on Jan. 13, 1975, now U.S. Pat. No. 4,027,962.

Lamps 48 traverse platen 38 to illuminate incremental areas of composition frame 40. In this way, the light rays from composition frame 40 and the modulated light images of the transparencies are transmitted in a downwardly direction onto mirror 50. Mirror 50 reflects the combined light image through lens 44. Preferably, lens 44 is a six-element split dagor type of lens having front and back compound lens components with a centrally located diaphragm therebetween. Lens 44 forms a high quality image with a field angle of about 31° and a speed ranging from about F/4.5 to about F/8.5 at 1:1 magnification. In addition, lens 44 is designed to minimize the effect of secondary color in the image plane. The front lens component has three lens elements including, in the following order, a first lens element of positive power, a second lens element of negative power cemented to the first lens element, and a third lens element of positive power disposed between the second lens element and the diaphragm. The back lens component also has three similar lens elements positioned so that lens 44 is symmetrical. Specifically, the first lens element in the front component is a double convex lens, the second element a double concave lens and the third element a convex-concave lens element. For greater details regarding lens 44, reference is made to U.S. Pat. No. 3,592,531 issued to McCrobie in 1971.

The light image transmitted from lens 44 passes through one of the filters in filter mechanism 46. Preferably, filter mechanism 46 includes a housing which is mounted on lens 44 by a suitable bracket and moves with lens 44 during scanning as a single unit. The housing of filter 46 includes a window which is positioned relative to lens 44 permitting the light rays of the combined image, i.e. that of the composition frame and transparency to pass therethrough. The bottom and top walls of the housing include a plurality of tracks which extend the entire width thereof. Each track is adapted to carry a filter to permit movement thereof from an inoperative position to an operative position. In the operative position, the filter is interposed into the window of the housing permitting light rays to pass therethrough. Individual filters are made from any suitable filter material such as coated glass. Preferably, three filters are employed in the electrophotographic printing machine depicted in FIG. 1, a red filter, a blue filter and a green filter. A detailed description of the filter mechanism is found in U.S. Pat. No. 3,775,006 issued to Hartman et al. in 1973.

As previously noted, lamps 48, lens 44, and filter 46 move in synchronism with drum 10. The light image transmitted therethrough is reflected by mirror 53 in a downwardly direction onto the charged portion of photoconductive surface 12. This selectively dissipates the charge theron to record a single color electrostatic latent image. This single color electrostatic latent image may comprise a modulated electrostatic latent image of the transparencies as well as an umodulated electrostatic latent image of the composition frame.

While the invention has been described in connection with a plurality of slide projectors, one skilled in the art will appreciate that the invention is not necessarily so limited and that a single slide projector may be employed. For example, slide projector 21 and mirror 29 may be omitted with slide projector 20 being movable. In this embodiment, slide projector 20 transmits a light image of the first transparency onto a portion of the charged region of photoconductive surface 12. During this cycle, development, transfer, fusing, cleaning and re-charging are inhibited. In this manner, while drum 10 makes a complete revolution during the first cycle, slide projector 20 is moved to a second position. When slide projector 20 is located in the second position, the next transparency is indexed into the operative position and a light image thereof is projected onto the remaining charged region of photoconductive surface 12 recording a second electrostatic latent image thereon. Hence, during the second cycle, photoconductive surface 12 has two non-overlapping electrostatic latent images recorded thereon. These latent images now undergo the normal processing, i.e. development, transfer and fusing. This results in a pair of transparencies being reproduced on a common copy sheet.

In recapitulation, the electrophotographic printing machine is adapted to reproduce a plurality of color transparencies simultaneously. The foregoing is achieved by projecting enlarged light images of the color transparencies into the charged portion of the photoconductive member. In this way, a plurality of color transparencies may be readily reproduced in the electrophotographic printing machine.

Thus, it is apparent that there has been provided, in accordance with the present invention, an electrophotographic printing machine that fully satisfies the objects, aims and advantages hereinbefore set forth. While this invention has been discussed in conjunction with a specific embodiment thereof, it is evident that many alternatives, modifications and variations will be apparent to those skilled in the art in light of the foregoing description. Accordingly, it is intended to embrace all such alternatives, modifications and variations that fall within the spirit and broad scope of the appended claims.

What is claimed is:

1. A xerographic printing machine arranged to reproduce on the same support material a plurality of transparencies side by side without overlap comprising
    a photoconductive recording member,
    means for electrostatically, uniformly charging an image forming area of the photoconductive member,
    forming means for forming a plurality of nonoverlapping latent electrostatic images side by side on the imaging area of the photoconductive member including at least a pair of slide projectors arranged to project at least a pair of non-overlapping light images onto the charged portion of the photoconductive member to form latent images thereon corresponding to enlargements of the transparencies being reproduced, said forming means including a transparent platen member disposed in a light receiving relationship with the light images transmitted from the pair of slide projectors and a field lens mounted on the platen member,
    means for developing substantially simultaneously each latent image with particles to form at least two nonoverlapping power images on the photoconductive member,
    means for transferring each of the powder images from the photoconductive member to the same sheet of support material and
    means for fixing substantially permanently each of the powder images to the same sheet of support material to which the side by side powder images are transferred.

2. A printing machine as recited in claim 1, wherein said forming means includes means for modulating the light image of the transparencies.

3. A printing machine as recited in claim 2, wherein said forming means includes means for filtering the light images of the transparencies to form single color light images which irradiate the charged area of said photoconductive member to record single color electrostatic latent images thereon.

4. A printing machine as recited in claim 2, wherein said modulating means includes a screen interposed between said field lens and said platen member.

5. A printing machine as recited in claim 1, further including:
    a composition frame disposed on said transparent platen member with said first lens being positioned thereover; and
    means for exposing the charged area of said photoconductive member to a light image of said composition frame recording thereon combined electrostatic latent images of the transparencies and the electrostatic latent image of said composition frame.

* * * * *